United States Patent [19]

Quintana

[11] Patent Number: 4,824,231
[45] Date of Patent: Apr. 25, 1989

[54] BROAD ANGLE REAR VIEW MIRROR ASSEMBLY

[76] Inventor: Ross Quintana, P.O. Box 5031, Moss Point, Miss. 39563

[21] Appl. No.: 75,415

[22] Filed: Jul. 20, 1987

[51] Int. Cl.[4] .................................................. G02B 5/10
[52] U.S. Cl. .................................... 350/632; 248/479; 350/625
[58] Field of Search .............. 248/467, 479, 484, 488; 350/615, 625, 627, 630, 631, 636

[56] References Cited

U.S. PATENT DOCUMENTS

| | | | |
|---|---|---|---|
| 2,605,676 | 8/1952 | Couch | 350/625 |
| 2,636,418 | 4/1953 | Leonard . | |
| 2,802,394 | 8/1957 | Krone | 350/627 |
| 3,104,274 | 9/1963 | King | 350/625 |
| 3,146,296 | 8/1964 | Fischer | 350/625 |
| 3,170,985 | 2/1965 | Katulich | 350/625 |
| 3,175,463 | 3/1965 | Seashore | 350/625 |
| 3,337,285 | 8/1967 | Travis | 350/625 |
| 3,338,655 | 8/1967 | Young | 350/625 |
| 3,375,053 | 3/1968 | Ward | 350/625 |
| 3,424,517 | 1/1969 | Budreck | 350/625 |
| 3,667,833 | 6/1972 | Baldwin | 350/625 |
| 3,901,587 | 8/1975 | Haile | 350/632 |
| 4,029,399 | 6/1977 | Haile | 350/632 |

Primary Examiner—John K. Corbin
Assistant Examiner—Martin Lerner
Attorney, Agent, or Firm—George L. Williamson

[57] ABSTRACT

A rear viewing apparatus is provided having a convex mirror having a frame backing attached by rotatable hinges to a second frame having straps thereon for mounting onto a conventional truck mirror. The frame backing of the convex mirror is attached by rotatable hinges to the mounting frame having a larger and a smaller hinge providing for an approximate 15 degree angle between the convex mirror and the mounting frame. Thereby, a rear-view viewing angle of approximately 86 degrees is provided.

5 Claims, 1 Drawing Sheet

U.S. Patent    Apr. 25, 1989    4,824,231
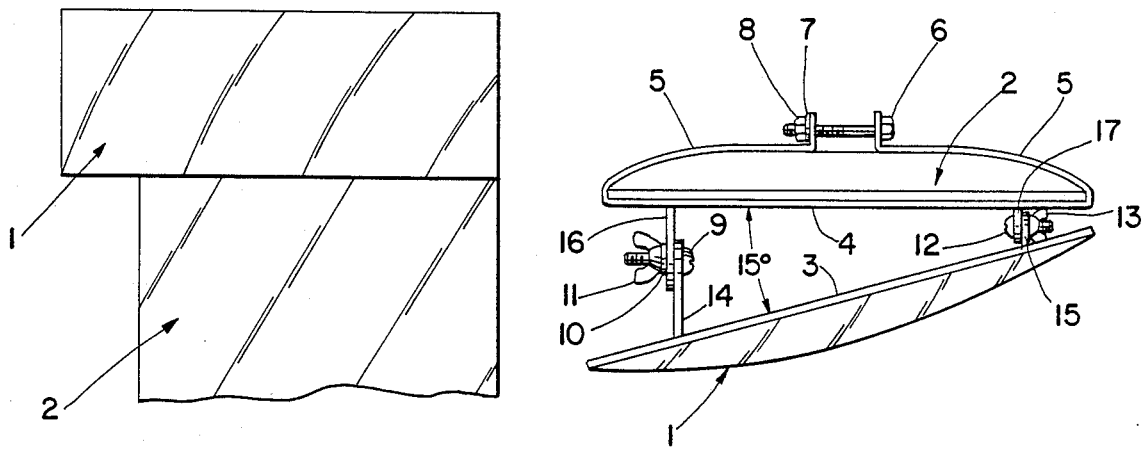
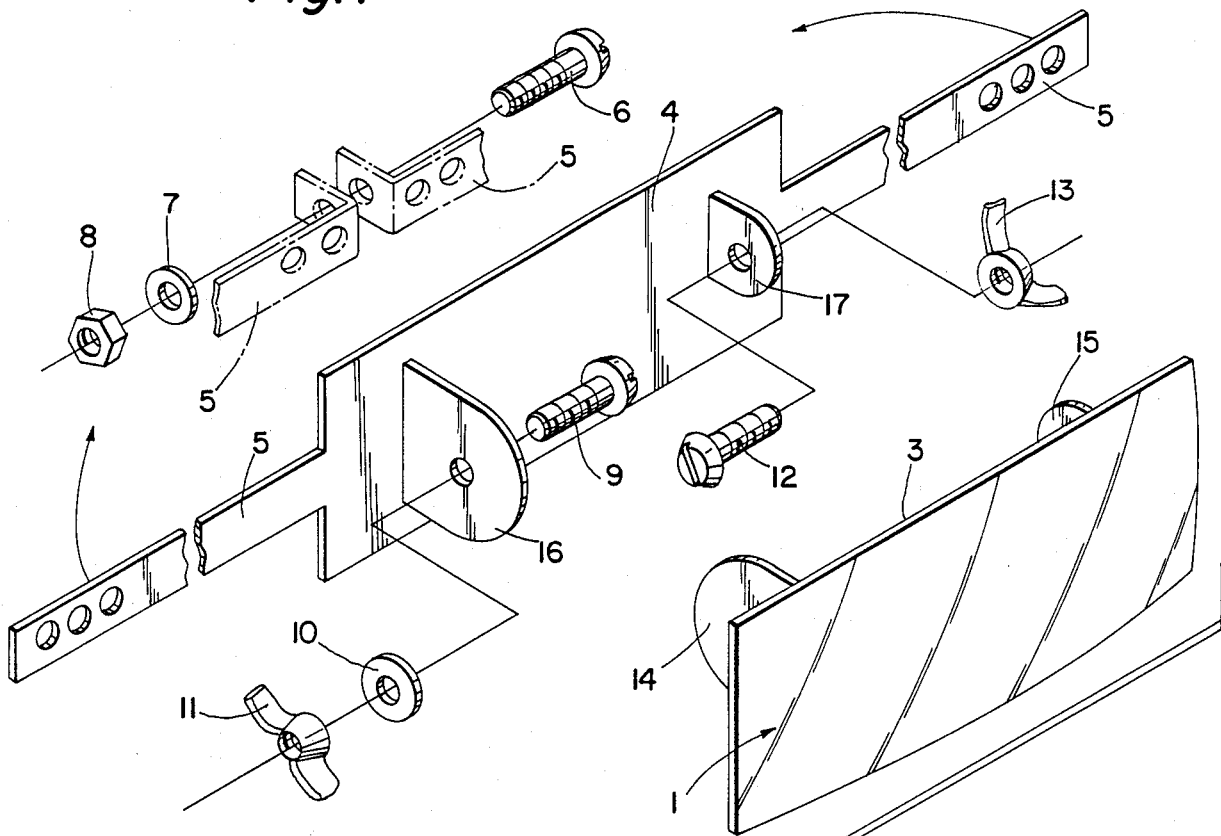

BROAD ANGLE REAR VIEW MIRROR ASSEMBLY

BACKGROUND OF THE INVENTION

The field of this invention generally relates to the provision of rear view vehicle mirrors. More particularly, the present invention relates to the provision of a rear view mirror suited for large trucks. The present invention generally affords a rear view mirror having very broad angular scope and providing a wide angle of rear vision.

Wide angle rear view mirrors have been found in the prior art. King, in U.S. Pat. No. 3,104,274, described a rear view vehicle mirror to be applied to a presently flat rear view mirror to provide a mirror combination simultaneously affording undistorted rear view vision of limited angular scope and wide angle rear view vision. Budreck, in U.S. Pat. No. 3,424,517, described a twin rear vision mirror assembly for providing a wide angle of viewing. Baldwin, in U.S. Pat. No. 3,667,833, described a rear view mirror having a plain and a convex portion for viewing on both sides of the vehicle in addition to the rear thereof. Couch, in U.S. Pat. No. 2,605,676, described a rear view mirror assembly having an objective to increase the visibility zone of the driver. Krone, in U.S. Pat. No. 2,802,394, described an auxiliary reflector securing means to be attached to existing rear view mirrors of motor vehicles.

However, none of the prior art contains the new and unique features of the present invention.

SUMMARY OF THE INVENTION

An objective of the present invention is to provide an apparatus for eliminating blind areas in the rear viewing area for large trucks, e.g, 18 wheel type trucks. It is designed to be attached to a presently flat conventional truck side view mirror. Once the mirror is attached the driver won't be confused as to what he is observing to the rear.

Three of the worst situations that occur with rear view areas are: (1) when one is making a forward right turn the rear end of the trailer cannot be seen after you start your turn; (2) when making a forward left turn into traffic and the rear of the tractor-trailer rig is cocked at an angle more than approximately 10° one cannot see the incoming traffic behind you, and; (3) if one needs to back up from the right side with the tractor of the rig turned to the right side of the trailer it is difficult to see to the rear of the rig.

These three difficult viewing areas account for most of the accidents that happen in busy commercial areas.

An objective of the present invention is to eliminate these problems. When making a forward right turn the present invention combined with a standard mirror will have approximately 87 degrees of viewing area and one will have the same viewing area when making a forward left turn into traffic or when backing up from the right side.

A unique feature of this mirror is the frame. The manner in which it is structured, with it being built at about a 15 degree horizontal plane angle to it's base mount. When it is mounted to the conventional mirror the viewing area starts where the standard mirror ends so that the standard mirror has approximately 12 degrees of viewing and the present invention has approximately 76 degree of viewing which gives a total of approximately 87 degrees of viewing.

The mirror consists of a convex mirror approximately 3¼ inch by 8 inch mounted at about a 15 degree horizontal angle to the existing conventional mirror with a steel strap and screw and nut assembly. The frame is made of plastic. The frame is very simply made with one adjustment which is an up and down vertical angular adjustment. The reason for this adjustment is because drivers being of different heights require this adjustment to correspond with the drivers height. The present mirror when mounted properly automatically provides approximately 87 degrees of viewing area with aproximately 26 degrees of vertical viewing area.

The most common mirror currently used today is a round convex mirror which gives a distorted view of its images. Likewise, it has a wide angle so that much is included in the view which is unnecessary, for example, the sky may show in the viewing area which is deceiving to a driver.

BRIEF DESCRIPTION OF THE DRAWINGS

FIG. 1 shows partial elevation view of the present invention shown in operative connection with a conventional truck mirror.

FIG. 2 shows a plan view of the present invention.

FIG. 3 shows a perspective view of the present invention.

FIG. 4 is a perspective photograph of the present invention.

DESCRIPTION OF THE PREFERRED EMBODIMENTS

Turning now to the drawings, FIG. 1, shows an elevation view of the convex mirror of the present invention, 1, attached to a conventional presently flat truck mirror, 2.

FIG. 2 shows the general features of the present invention. The convex mirror, 1, is shown along with a conventional truck mirror, 2. The mirror base mount, 3, is shown along with the back mounting plate of the frame 4. A steel hold down strap or strap of like material is shown at 5, being innerconnected by a bolt, washer and nut assembly, 6,7, and 8. The vertical angular adjustment of the mirror is provided by a larger rotable hinge structure, 16, having a wing nut, washer and screw at 9, 10, and 11. A smaller rotatable in assembly is also shown at 16 and 17.

Turning to FIG. 3, the convex mirror is shown at 1, and the mirror bse mount is shown at 3. Additionally, the back mounting plate of the frame is shown at 4 and the steel or like material hold down strap is shown at 5. The vertical adjustable larger angular hinge is shown at 14 with its counterpart piece being shown at 16. The smaller rotatable hinge is shown at 15 with its counterpart being at 17. Connecting means are shown at 9, 10 and 11 being the nut washer and wing nut for the large rotatable hinges 14 and 16 and at 12 and 13 for the smaller hinge. Additionally, means for connecting the holddown strap, 5, to the back mounting plate is shown connecting said strap to the back plate at 14.

Turning now to the photograph, the pertinent features of the present invention are shown in perspective view.

I claim:

1. A rear viewing apparatus comprising:
(a) a back mounting plate;

(b) a convex mirror being connected to said back mounting plate;
(c) a first connecting means for connecting said convex mirror to said back mounting plate;
(d) a second connecting means for attaching said back mounting plate to a presently flat conventional mirror; and
(e) said first connecting means forming a horizontal plane angle of about 15 degrees between said convex mirror and said back mounting plate.

2. The apparatus of claim 1, further comprising:
(a) said first connecting means being a first, larger rotatable hinge and a second, smaller rotatable hinge;
(b) said first, larger rotatable hinge and said second, smaller rotatable hinge providing a horizontal angle of about 15 degrees between said convex mirror and said back mounting plate; and
(c) said first, larger rotatable hinge and said second, smaller rotatable hinge further providing a vertical angular adjustment.

3. The apparatus of claim 2, further comprising:
A. said second connecting means being a strap.

4. The apparatus of claim 3, further comprising:
A. said strap being of steel material.

5. The apparatus of claim 3, further comprising:
A. said strap having connecting means for connecting its ends together.

* * * * *

UNITED STATES PATENT AND TRADEMARK OFFICE
CERTIFICATE OF CORRECTION

PATENT NO. : 4,824,231

DATED : Apr. 25, 1989

INVENTOR(S) : Ross Quintana

It is certified that error appears in the above-identified patent and that said Letters Patent is hereby corrected as shown below:

Column 2, line 47, after "structure," add -- 14 and --.

Column 2, line 49, change "16" to -- 15 --.

Column 2, line 62, delete "at 14".

Signed and Sealed this

Thirteenth Day of February, 1990

Attest:

JEFFREY M. SAMUELS

*Attesting Officer*   *Acting Commissioner of Patents and Trademarks*